United States Patent [19]
Obeda et al.

[11] Patent Number: 6,026,920
[45] Date of Patent: Feb. 22, 2000

[54] DYNAMIC SEAT-MOVING AND LEVELING DEVICE

[75] Inventors: Edward G. Obeda, 35 Sunset Hill Rd., Brookfield, Conn. 06804; Denis P. O'Sullivan, deceased, late of Danbury, Conn., by Gerard P. O'Sullivan, executor

[73] Assignee: Edward G. Obeda, Brookfield, Conn.

[21] Appl. No.: 09/089,589

[22] Filed: Jun. 2, 1998

[51] Int. Cl.[7] .......................... B60G 21/00; B60G 23/00
[52] U.S. Cl. ............................................. 180/41; 180/326
[58] Field of Search .............................. 180/41, 326, 330, 180/89.13

[56] References Cited

U.S. PATENT DOCUMENTS

| | | |
|---|---|---|
| 3,466,089 | 9/1969 | Stueckle . |
| 3,632,076 | 1/1972 | Rogers, Jr. . |
| 3,670,834 | 6/1972 | Rogers . |
| 3,857,533 | 12/1974 | Mason ........................................ 180/41 |
| 4,515,337 | 5/1985 | Torras . |
| 5,048,893 | 9/1991 | Cowan et al. . |
| 5,054,739 | 10/1991 | Wallin . |
| 5,372,347 | 12/1994 | Minnich . |
| 5,857,535 | 1/1999 | Brooks ....................................... 180/41 |

*Primary Examiner*—Kenneth R. Rice
*Attorney, Agent, or Firm*—Robert J. Harter

[57] ABSTRACT

A dynamic seat leveling device for a riding lawnmower or tractor has a virtual rotational point located below the leveling device itself. When operated on hilly terrain, such an arrangement accomplishes three objectives: 1) the operator remains level; 2) the operator's center of gravity remains centered directly above a critical balance point which is at ground level, midway between the right and left wheels; and 3) the operator remains at a constant elevation. Keeping the operator at a constant elevation, as the leveling device shifts from one side to the other, minimizes the power that would otherwise be needed to repeatedly raise and lower the operator as the tractor tilts from left to right. Minimizing the power required allows the use of a compact leveling drive that fits between the seat and frame of the tractor.

20 Claims, 15 Drawing Sheets

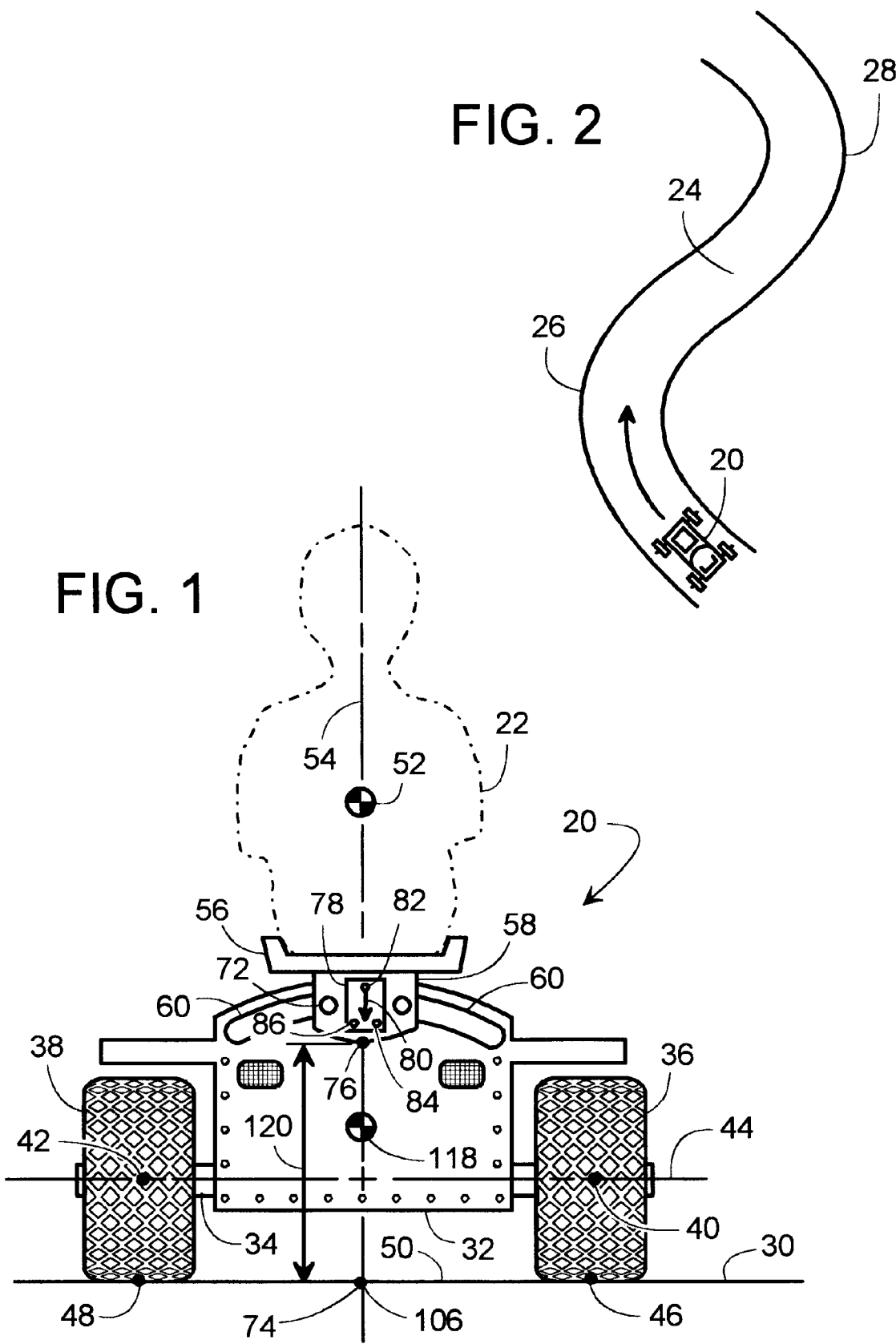

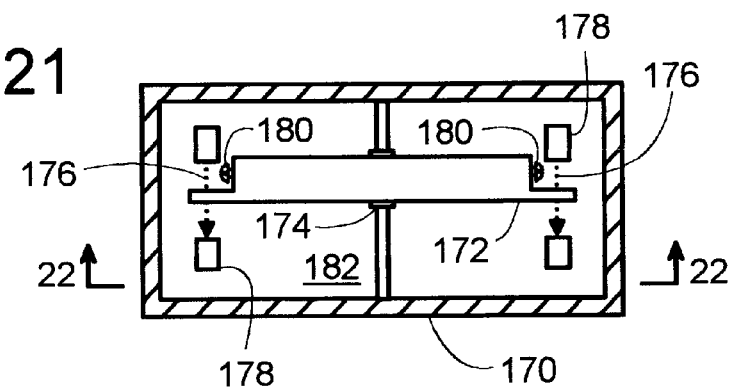
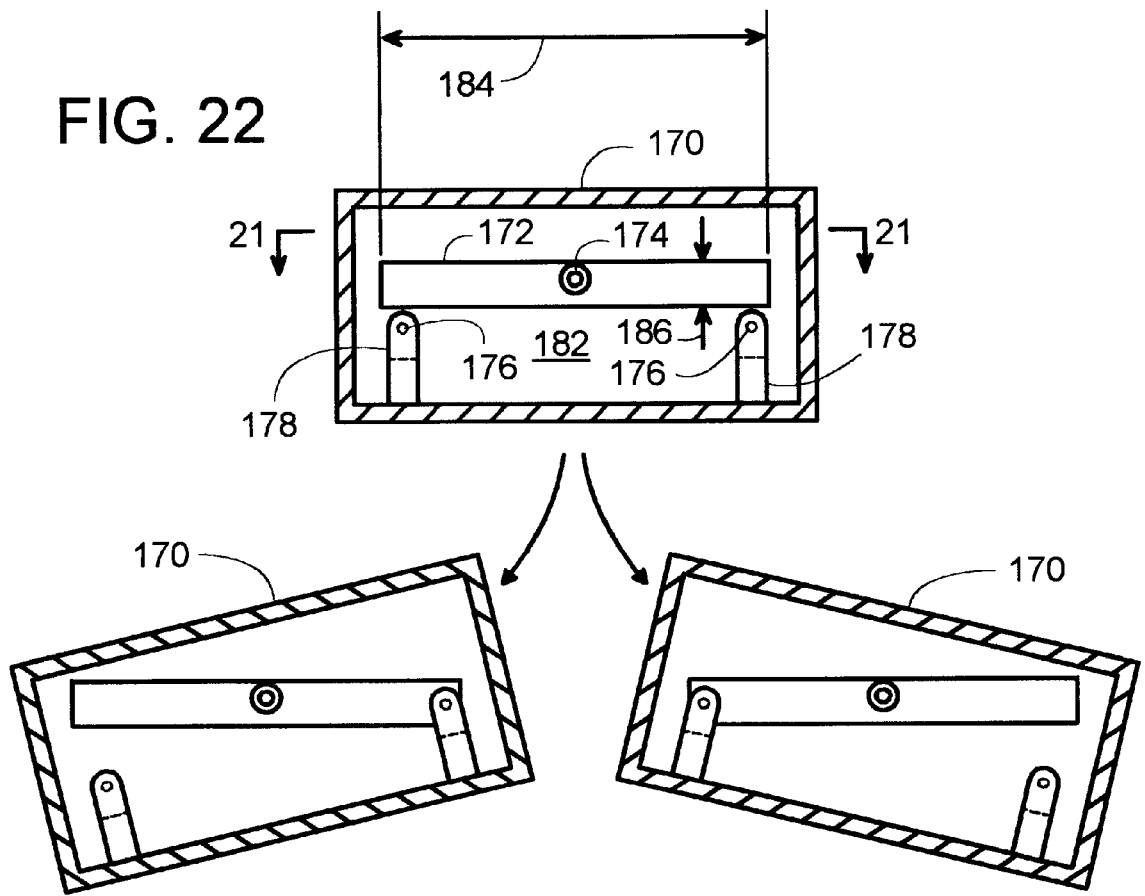

DYNAMIC SEAT-MOVING AND LEVELING DEVICE

BACKGROUND OF THE INVENTION

1. Field of the Invention

The subject invention generally pertains to riding lawnmowers, and more specifically, to a means for dynamically leveling the seat.

2. Description of Related Art

In operating a riding lawnmower tractor, it is desirable to shift one's weight to compensate for the tractor tilting while traversing hills and to compensate for centrifugal force when turning. For rider comfort, it is also nice to keep the seat level.

There is an important distinction between shifting the operator's weight and just simply keeping the seat level. Leveling the seat is primarily for comfort, while properly shifting the operator's weight can improve traction and safety. While traversing hills, the uphill wheel can lose traction, as weight shifts to the lower wheel. On a hill, it is desirable to have the operator's center of gravity directly above a point on the ground that is halfway between the two wheels. Shifting the operator's weight even closer to the uphill wheel is even better, as it helps compensate for the tractor's center of gravity shifting downhill.

U.S. Pat. Nos. 3,466,089; 4,515,377; and 5,372,347 each have seat leveling devices. But in each case, the operator's weight is not shifted to where it belongs. In the FIG. 1 of each device, it is clear that when projecting a line straight downward from the operator's center of gravity, that line intersects the surface of the ground at a point closer to the downhill wheel. The farther downhill the weight is shifted, the greater is the traction imbalance and likelihood of tipping.

The very same problem exists with the devices of U.S. Pat. Nos. 4,636,001 and 5,054,739. However, the problem is not as apparent, because the drawing figures do not illustrate how an operator's weight is shifted relative to a tractor. Nonetheless, the same problem exists unless the seat is virtually set at ground level.

The self-leveling seat of U.S. Pat. No. 3,632,076 appears worst of all. The seat frame actually shifts closer to the downhill wheel.

SUMMARY OF THE INVENTION

To avoid the problems and limitations of existing self-leveling tractor seats, it is a first object of the invention to position a self-leveling seat's rotational point to an elevation that is below the leveling device itself.

A second object is to position the rotational point below the tractor's center of gravity.

A third object is to position the rotational point at or near ground level to keep the operator at a constant elevation, thereby minimizing the power that would otherwise be needed to repeatedly raise and lower the operator as the tractor tilts from left to right.

A fourth object to provide a leveling device that shifts every point of the seat frame uphill while traversing a hill.

A fifth object is to provide a self-leveling seat having a traveling deadband region in which slight changes in tilt do not reposition the seat regardless of the absolute tilt. The deadband is considered a "traveling deadband," as the location of the deadband is repositioned after each time the operator seat levels out.

A sixth object is to provide a self-leveling seat with an inclinometer that is dampened to disregard brief spikes in tilt.

A seventh object is to provide a self-leveling seat that both levels a seat and shifts an operator's weight properly.

An eighth object is to provide a compact self-leveling seat mechanism that has a low profile to fit between the seat and the frame of a tractor, yet provides a virtual rotational point that exists below the mechanism itself.

These and other objects of the invention are provided by a novel vehicle having a self-leveling seat whose virtual pivot point is below the tractor's center of gravity.

BRIEF DESCRIPTION OF THE DRAWINGS

FIG. 1 is a schematic back view of the invention on level ground.

FIG. 2 is a top view of the invention traveling along a curved path.

FIG. 21 is a top cross-sectional view of an inclinometer taken along line 21—21 of FIG. 22.

FIG. 22 is a front cross-sectional view of an inclinometer taken along line 22—22 of FIG. 21.

DESCRIPTION OF THE PREFERRED EMBODIMENT

Figure 3:
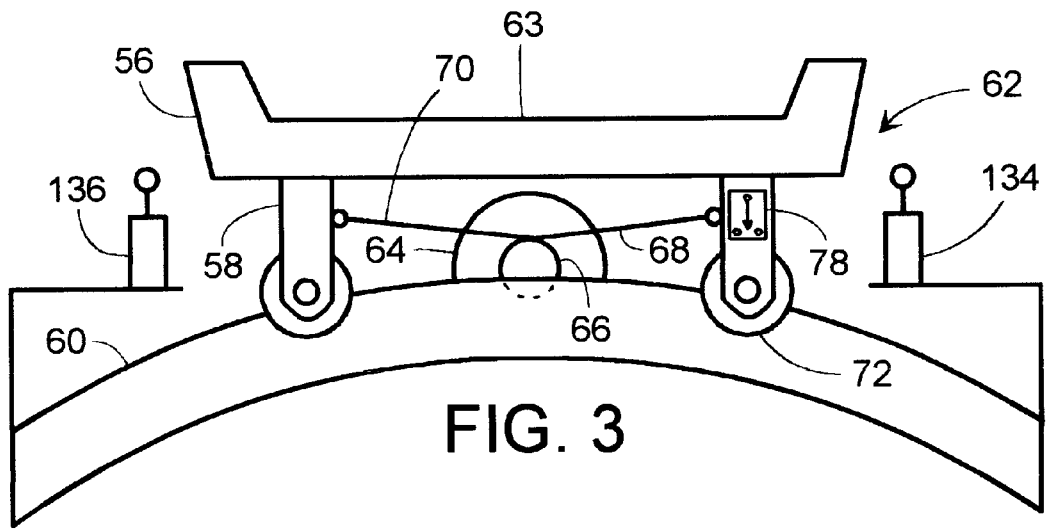
FIG. 3 is a schematic back view of a portion of the invention.
Figure 4:
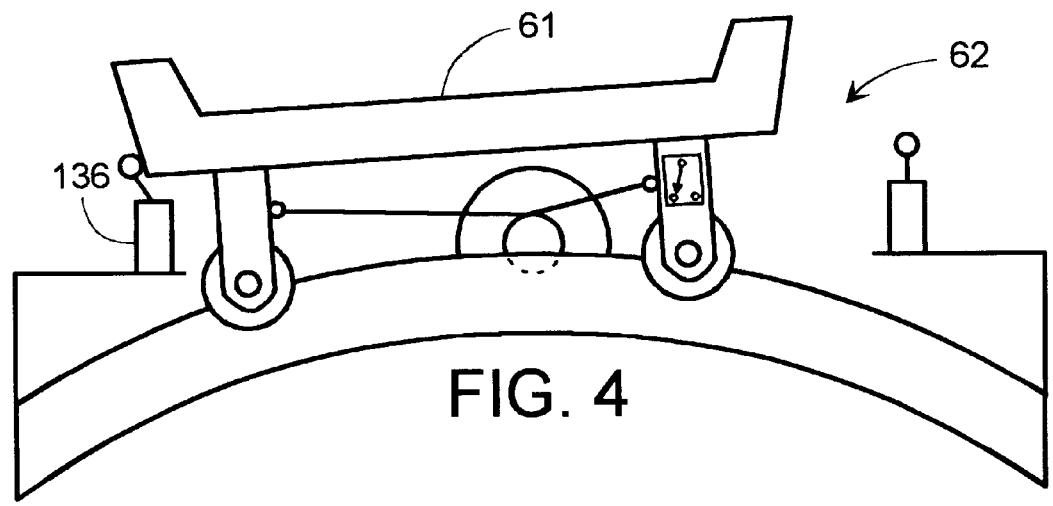
FIG. 4 is a schematic back view of a portion of the invention.
Figure 5:
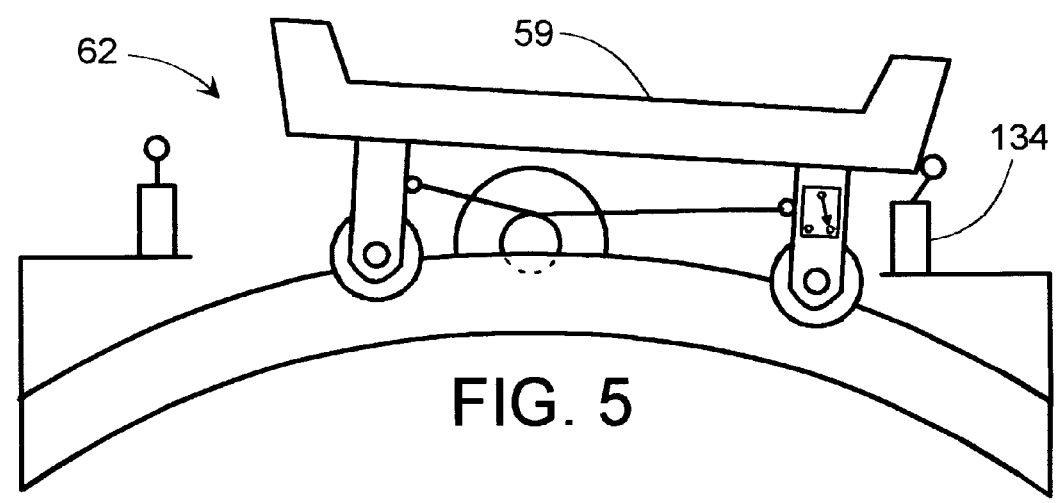
FIG. 5 is a schematic back view of a portion of the invention.
Figure 6:
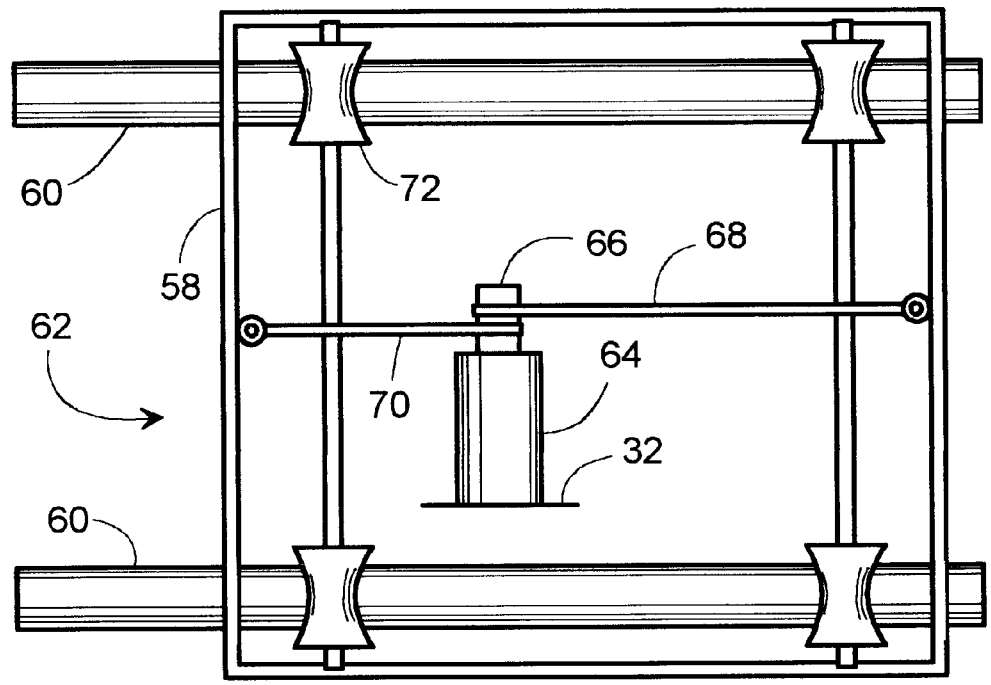
FIG. 6 is a schematic top view of the seat frame and track assembly.
Figure 7:
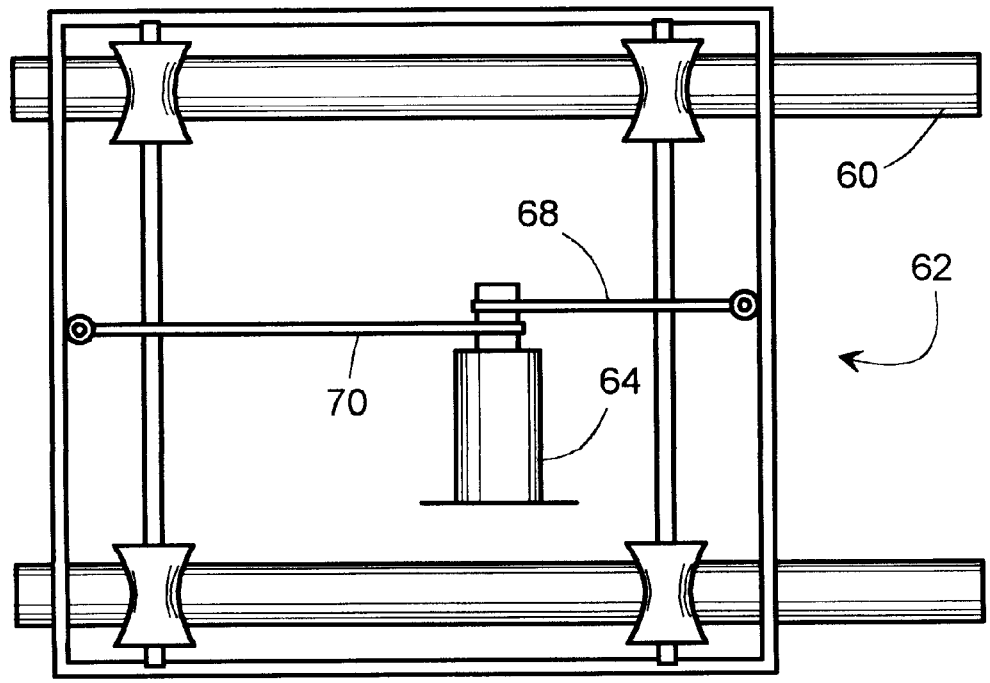
FIG. 7 is a schematic top view of the seat frame and track assembly.

Referring to FIGS. 1 and 2, a vehicle, including but not limited to a tractor 20 or a riding lawnmower, is shown carrying a vehicle occupant, such as an operator 22, along a path 24 having a varying direction (i.e., right turns 26 and left turns 28) and across a terrain 30 having a varying incline. Tractor 20 includes a base frame 32 and an axle 34 rotatably supporting a right wheel 36 and a left wheel 38. Wheels 36 and 38 rotate respectively about a right rotational point 40 and a left rotational point 42 which define an axle centerline 44. Wheels 36 and 38 contact terrain 30 at a right contact point 46 and a left contact point 48, respectively. Contact points 46 and 48 define a contact line 50.

Operator 22 having a center of gravity 52 acting along a vertical line 54 is supported by a cushioned seat 56. Seat 56, in turn, is supported by a seat frame 58. Seat frame 58 travels along an arcuate track 60 upon being driven by a seat drive 62 as shown in FIGS. 3–7.

Seat drive 62 includes a motor 64 that is attached to tractor frame 32. An output shaft 66 of motor 64 is coupled to seat frame 32 by way of cables 68 and 70. One end of each cable 68 and 70 is anchored to shaft 66 and are wrapped around shaft 66 in opposite directions, so that as shaft 66 rotates, one cable reels in while the other unwraps from shaft 66. By controlling the rotational direction of shaft 66, motor 64 is able to selectively drive seat frame 58 to a right position 59 (FIG. 5), a left position 61 (FIG. 4), and to a central position 63 (FIG. 3). To facilitate this movement, rollers 72 are used to support and guide seat frame 58 on track 60.

Returning to FIG. 1, in one embodiment of the invention, track 60 has a circular curvature with a center of curvature 74 that is lower than a bottom point 76 of seat frame 58. Bottom point 76 is defined as the lowest point of seat frame 58 when seat frame 58 is at its central position and tractor 20 is on level terrain.

Figure 8:
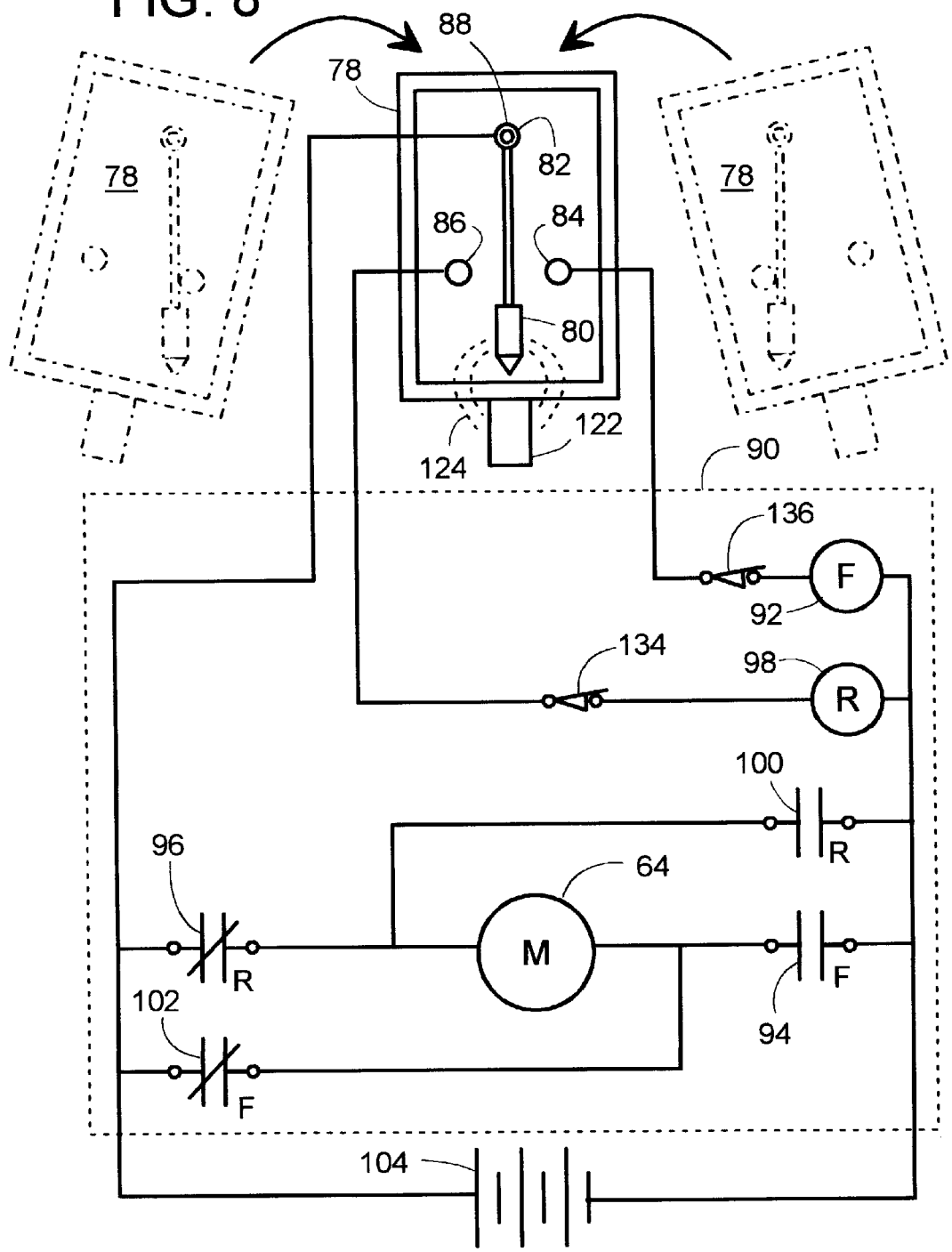
FIG. 8 is a wiring schematic of the invention.

To control seat drive 62, an inclinometer 78 is attached to seat frame 58. Referring to FIG. 8, inclinometer 78 includes a housing in which a plumb element 80 pivotally hangs from a pivot point 82. Inclinometer 78 includes three electrical contacts: a right contact 84, a left contact 86, and a common contact 88. Inclinometer 78 provides a reaction to being tilted. Tilting inclinometer 78 to the right closes contacts 88 and 84. Tilting inclinometer to the left closes contacts 88 and 86. The inclinometer's reaction to tilting controls a circuit 90 (part of seat drive 62). Circuit 90 includes a forward relay having a forward coil 92 with forward contacts 94 and 102. Circuit 90 also includes a reverse relay having a reverse coil 98 with reverse contacts 100 and 96. Contacts 96 and 102 are normally closed to serve as a shunt that provides motor 64 with a dynamic brake. Circuit 90 is wired to a battery 104 of tractor 20.

Figure 9:
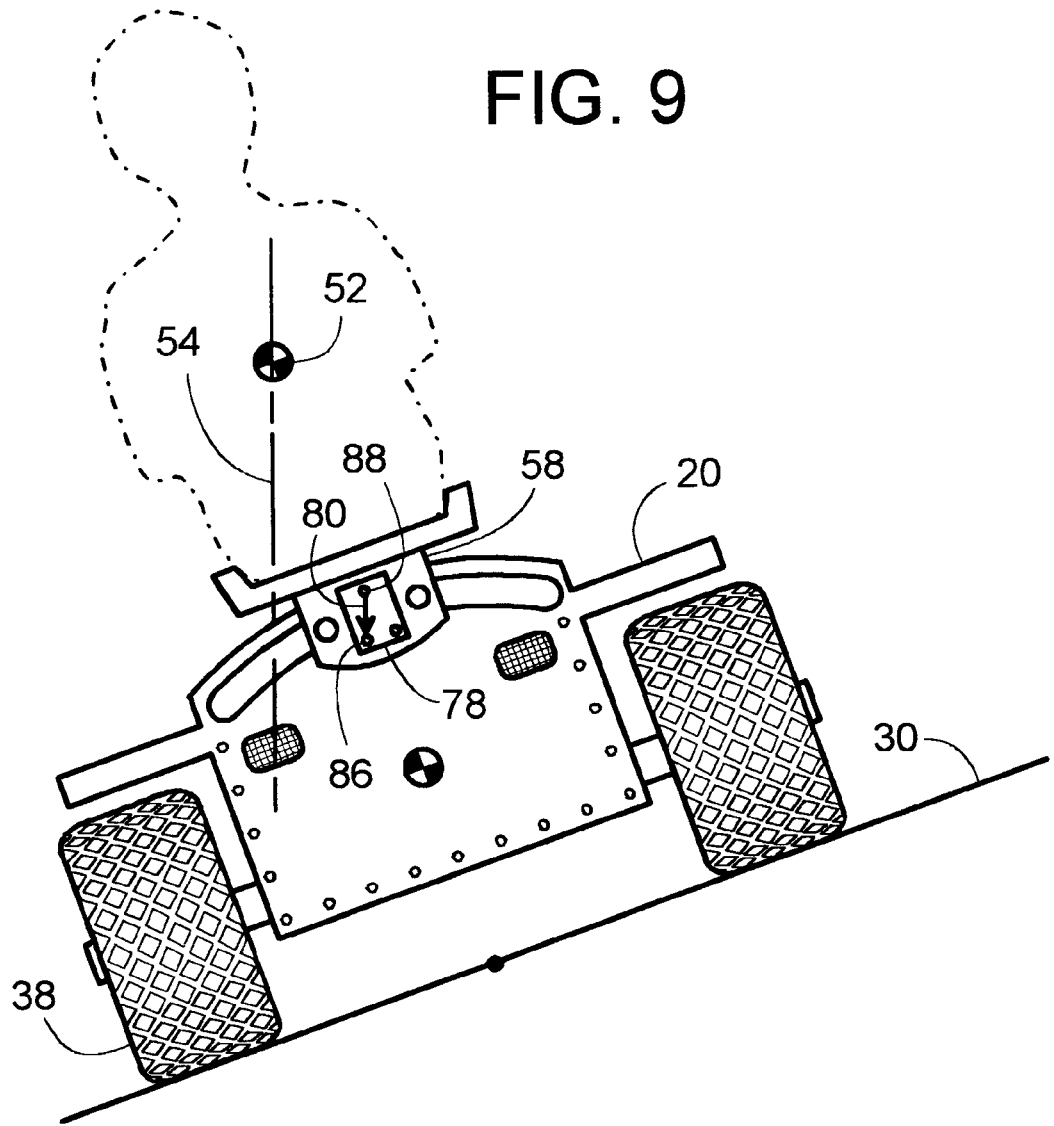
FIG. 9 is a schematic back view of the invention traversing terrain having a leftward angular inclination.
Figure 10:
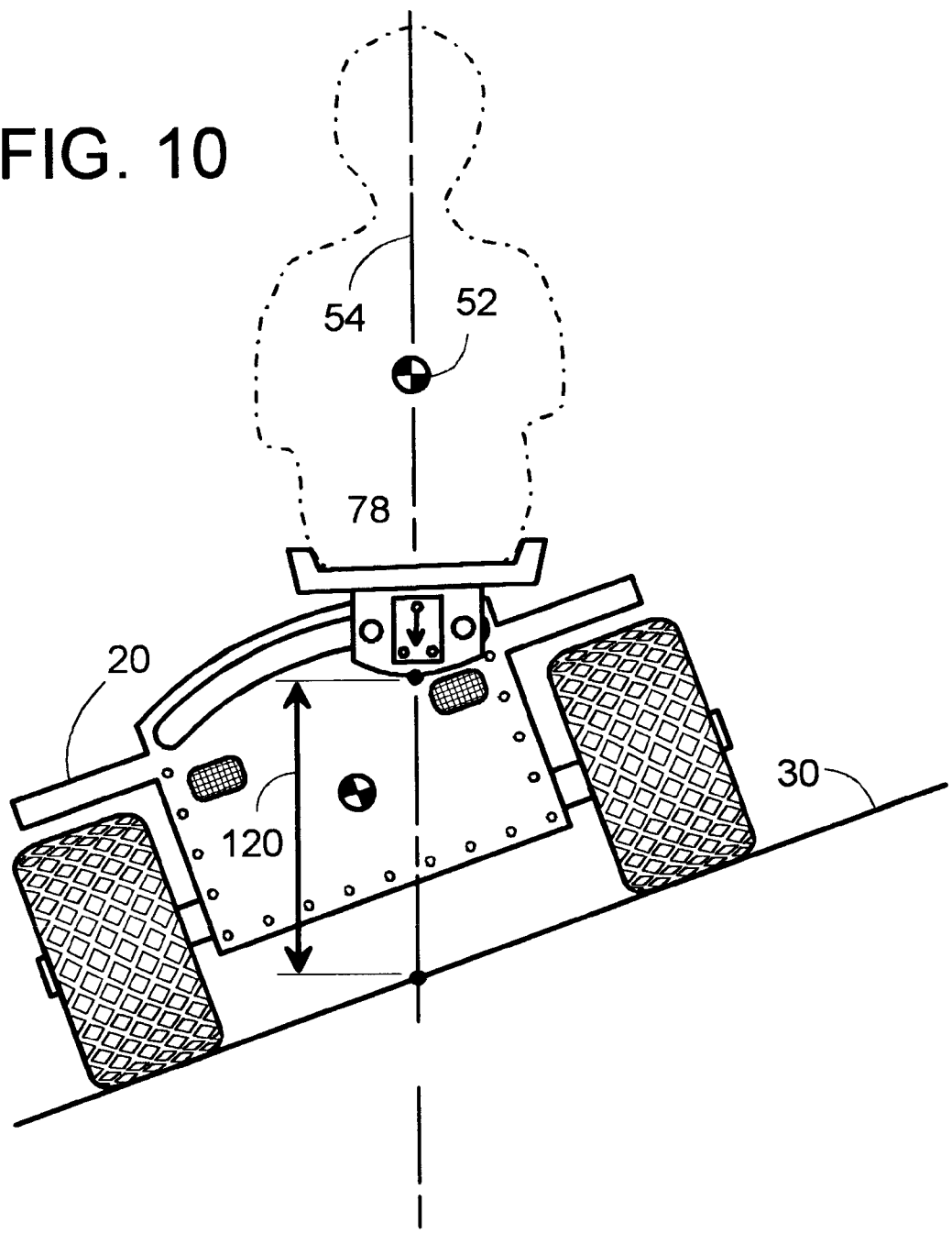
FIG. 10 is a schematic back view of the invention traversing terrain having a leftward angular inclination.
Figure 11:
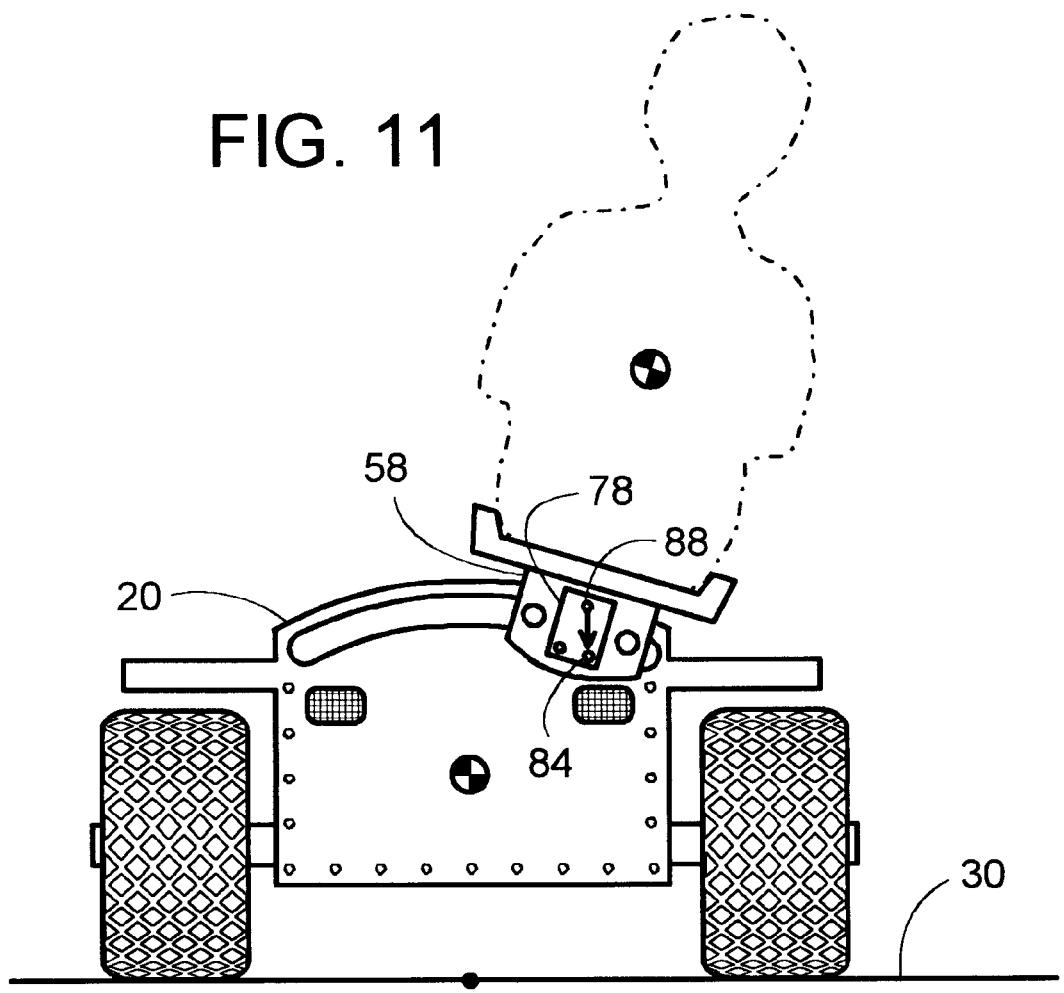
FIG. 11 is a schematic back view of the invention on level ground.

In FIG. 9, a leftward direction of incline of terrain 30 causes tractor 20 to tilt to the left. Likewise, plumb element 80 shifts toward left wheel 38. This closes contacts 86 and 88 to drive seat frame 58 to the right until inclinometer 78 is substantially vertical, as shown in FIG. 10. Note that height 120 remains substantially constant. As tractor 20 returns to level ground, as shown in FIG. 11, contacts 88 and 84 close. This reaction causes seat drive 62 to drive seat frame 58 to the left until inclinometer 78 is vertical once again, as shown in FIG. 1.

Figure 12:
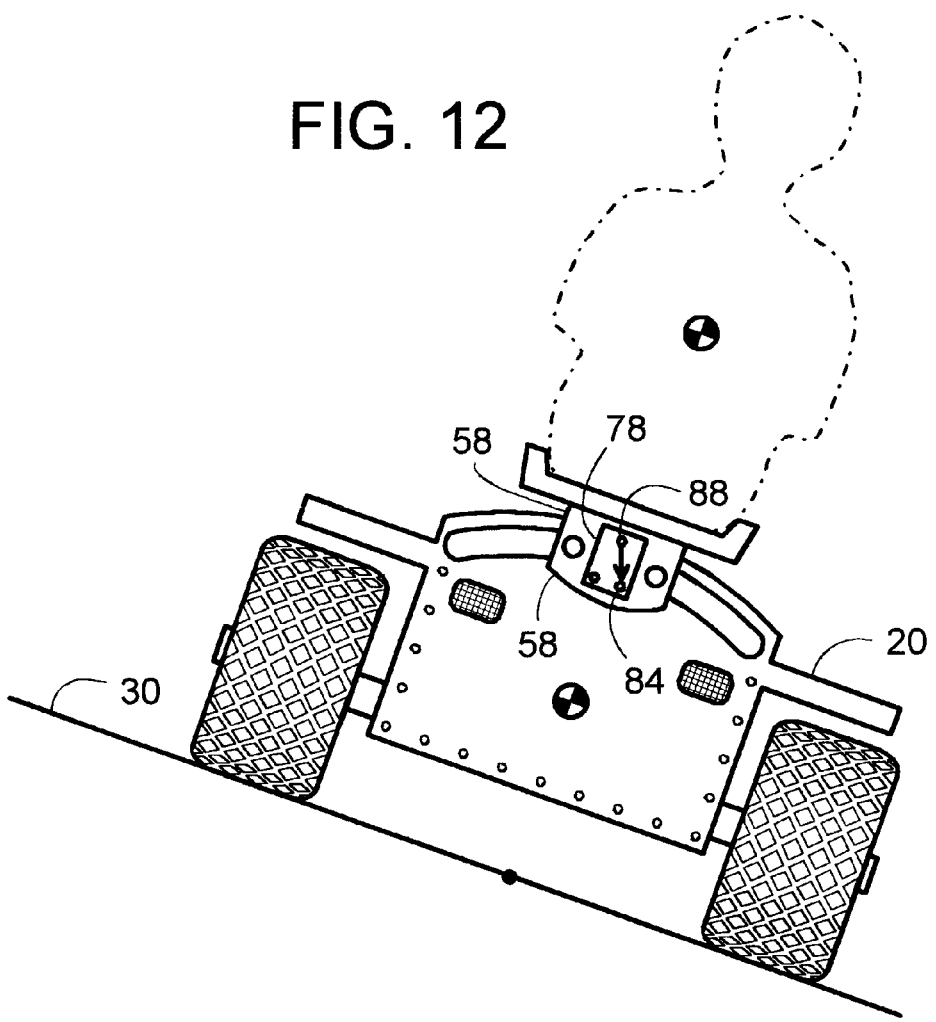
FIG. 12 is a schematic back view of the invention traversing terrain having a rightward angular inclination.
Figure 13:
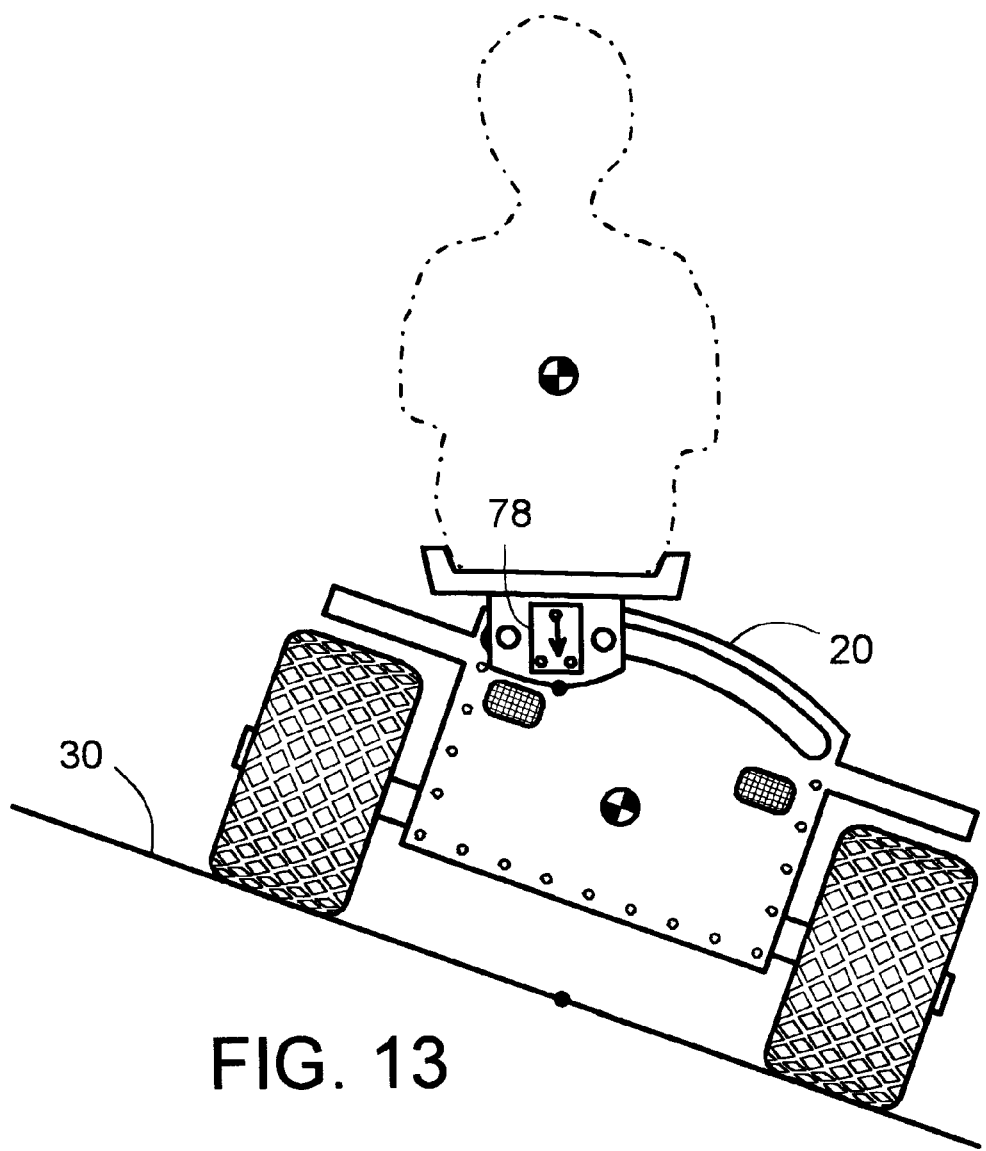
FIG. 13 is a schematic back view of the invention traversing terrain having a rightward angular inclination.
Figure 14:
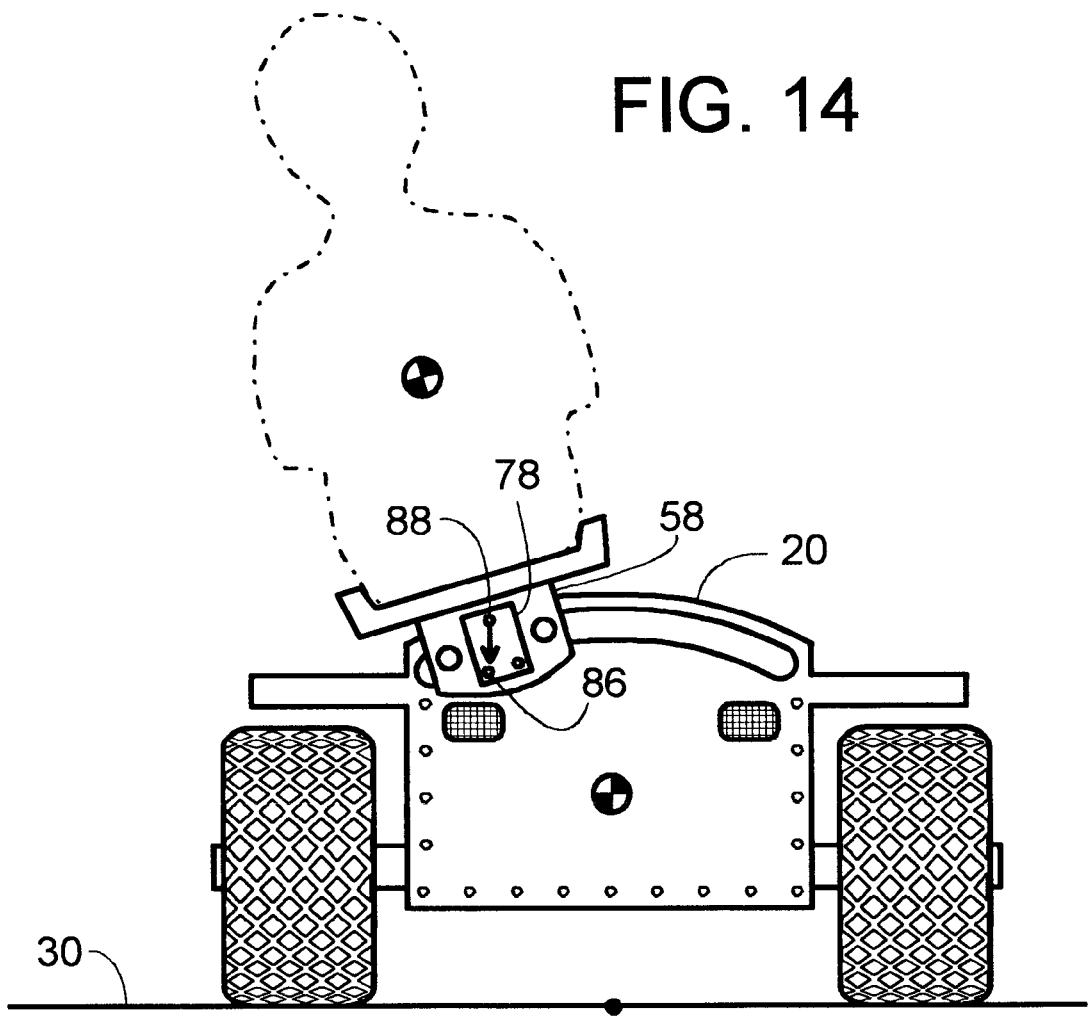
FIG. 14 is a schematic back view of the invention on level ground.

In FIG. 12, a rightward direction of incline of terrain 30 causes tractor 20 to tilt to the right. This closes contacts 88 and 84 to drive seat frame 58 to the left until inclinometer 78 is substantially vertical as shown in FIG. 13. As tractor 20 returns to level ground, as shown in FIG. 14, contacts 88 and 86 close. This reaction causes seat drive 62 to drive seat frame 58 to the right until inclinometer 78 is vertical once again, as shown in FIG. 1.

In the embodiment just described, seat frame 58 travels in a circular path about a center of curvature 74. In other embodiments of the invention; however, seat frame 58 can travel in a non-circular path from right position 59 to left position 61 yet still effectively rotate about a virtual rotational point 106. Virtual rotational point 106 being defined as the single point in space about which seat frame 58 would need to rotate if seat frame 68 were to be repositioned from right position 59 to left position 61 by purely circular motion. For example, referring to FIG. 15, as seat frame 58 moves in a non-circular path from right position 59 to left position 61, two arbitrary points 108 and 110 fixed relative to seat frame 58 can be repositioned from their illustrated right position 59 to their left position 61 by moving along any one of a myriad of paths, of which one is circular. It is the circular path that actually has a center of rotation which is referred to as a virtual rotational point 106 for the "myriad of paths" just mentioned. It should be clear to those skilled in the art that the myriad of paths can be accomplished by any one of a wide variety of known mechanisms including, but not limited to, curved tracks, axial sliding bearings, linear guideways, and pivoting linkages.

Figure 15:
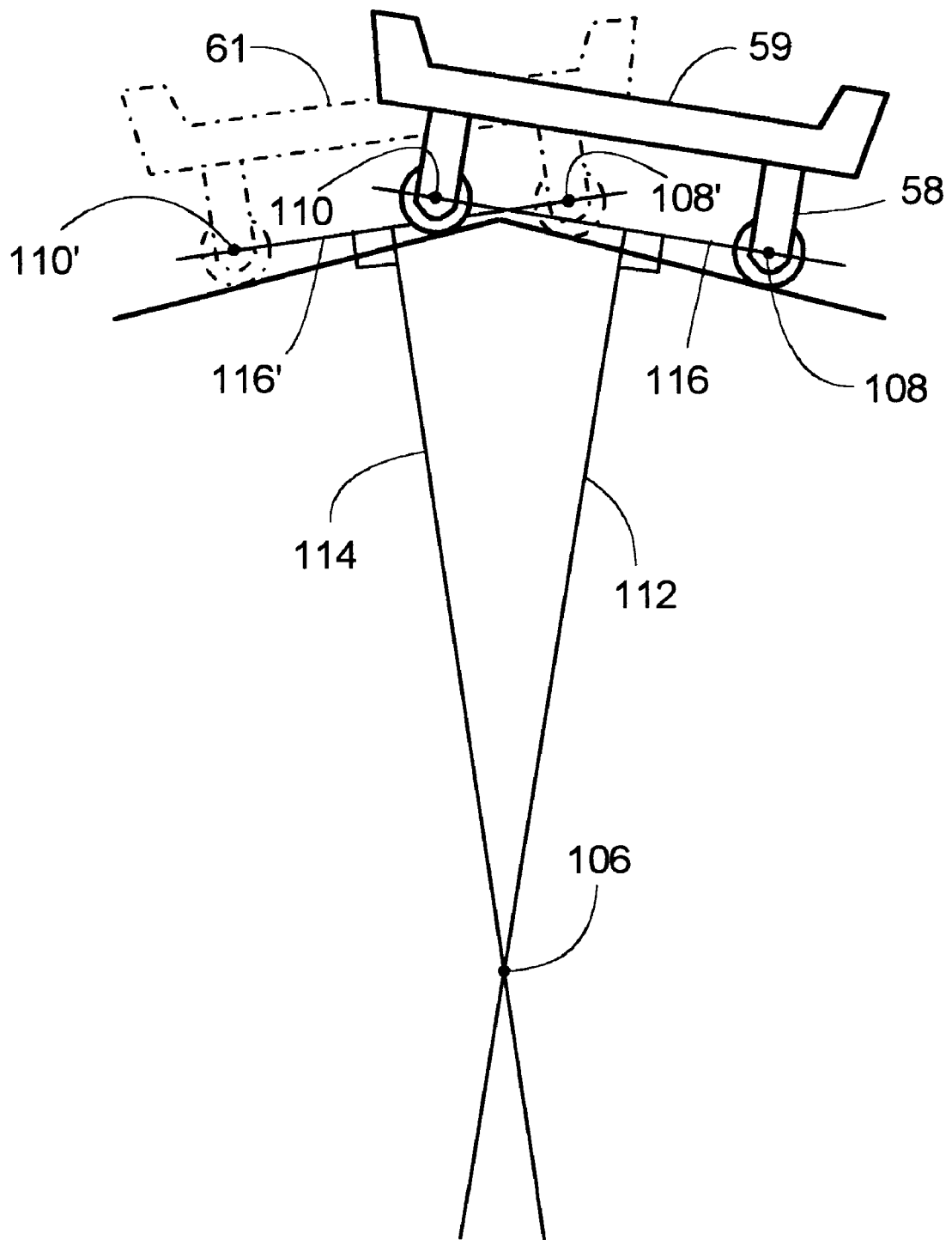
FIG. 15 schematically illustrates a virtual rotational point of straight track segments.

In FIG. 15, the virtual rotational point 106 is found at the intersection of lines 112 and 114. Line 112 is halfway between points 108 and 110 and perpendicular to a line 116 passing through points 108 and 110. Line 114 is halfway between points 108' and 110' and perpendicular to a line 116' passing through points 108' and 110'.

Establishing a virtual rotational point 106 at a position below bottom point 76 ensures that when tractor 20 traverses an inclined terrain even the lowest point of seat frame 58 shifts farther uphill than it would if virtual rotational point 106 were higher.

The overall stability of tractor 20 is enhanced by establishing a virtual rotational point 106 at a position below the tractor's center of gravity 118. This ensures that the operator and entire seat frame 58 shifts uphill relative to the tractor's center of gravity 118.

Placing virtual rotational point 106 at contact line 50 reduces the power required by seat drive 62. With virtual rotational point 106 generally at ground level, the height 120 of point 76 and the height of the operator's center of gravity 118 is kept quite constant (compare FIGS. 1 and 10). This means the weight of operator 22 doesn't need to be repeatedly raised and lowered by seat drive 62.

In some embodiments of the invention, inclinometer 78 provides a deadband between a first predetermined limit and a second predetermined limit of the angular inclination of inclinometer 78. In FIG. 8, a magnet 122 applies a centering force 124 that urges plumb element 80 to its central neutral position where contacts 84, 86 and 88 remain open. This leaves seat frame 58 where it is at until the inclination exceeds one of the predetermined limits to overcome centering force 124. At that time, the appropriate set of contacts closes to reposition seat frame 58.

Figure 16:
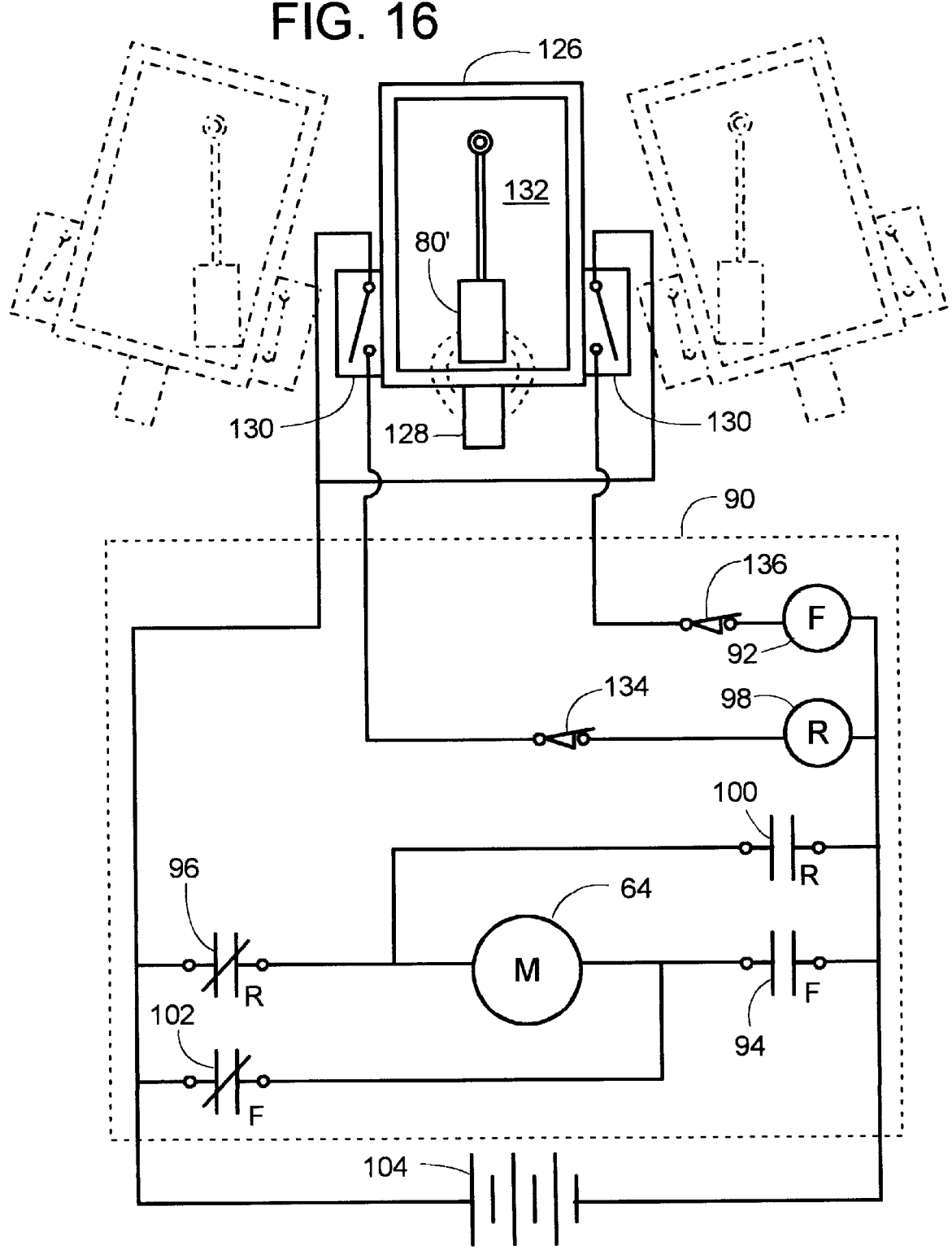
FIG. 16 is a wiring schematic of another embodiment of the invention.

In another embodiment, an inclinometer 126 of FIG. 16 accomplishes the same effect by having plumb element 80' magnetic. Plumb element 80' is attracted to an iron block 128, and also actuates reed switches 130 which replaces contacts 84, 86 and 88. Filling inclinometer 126 with a motion dampening fluid 132, such as oil, avoids erratic repositioning of the seat frame when traveling across rough terrain.

Figure 20:
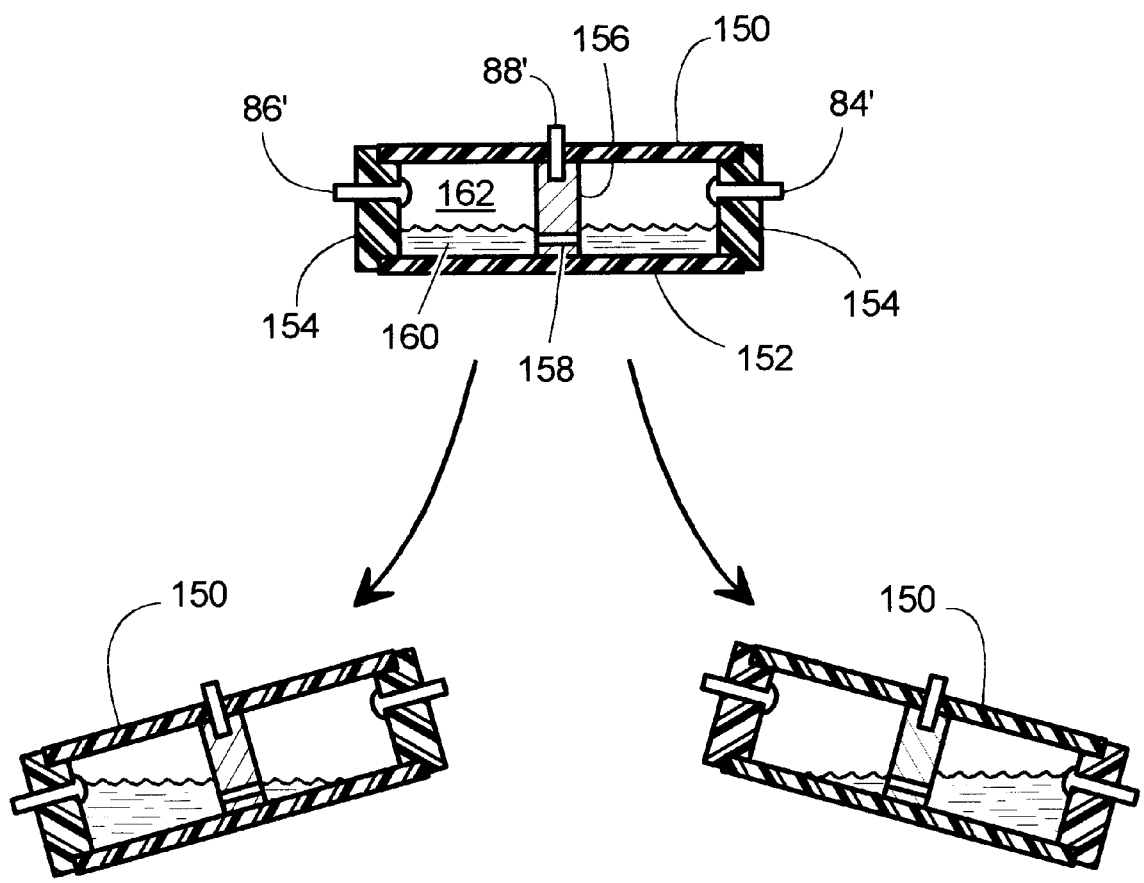
FIG. 20 shows a cross-sectional view of a cylindrical inclinometer.

In FIG. 20, a mercury switch type inclinometer 150 replaces inclinometer 78. With inclinometer 150, terminals 84', 86', and 88', correspond to contacts 84, 86, and 88 respectively. Cylindrical body 156 and end caps 154 are electrically nonconductive. A baffle 56 is electrically conductive and connected to common terminal 88'. An electrically conductive fluid 160 serves to make and break electrical contacts 88' with 86' and alternately 88' with 84' as inclinometer 150 tips back and forth. When fluid 160 is mercury, inclinometer 150 is directly connected to circuit 90 in the same way as inclinometer 78 is connected. If fluid 160 is much less conductive, such as the case with a glycerin solution (e.g., 50/50 glycerin and water mixture), then contacts 84', 86' and 88' are electrically coupled to circuit 90 by way of a conventional signal amplifier that may include field effect transistors. Erratic or inadvertent actuation is minimized by a small orifice 158 in baffle 156. Orifice 158 serves to restrict fluid 160 from rapidly sloshing back and forth between terminals 84' and 86'. Adding a second fluid 162 that does not mix well with fluid 160 and has a different density and electrical conductivity can further dampen the fluid movement. For example, in one embodiment of the invention, fluid 160 is mercury and fluid 162 is a glycerin solution.

Another embodiment of the invention employs a balance beam style inclinometer 170, as shown in FIG. 21 (top view) and FIG. 22 (front view). Inclinometer 170 includes a balance beam 172 that pivots about an upwardly offset pivot point 174 to alternately interrupt light beams 176 of phototransistors 178 as inclinometer 170 tilts back and forth. Phototransistors 178 are wired to circuit 90 in a manner that is obvious to those skilled in the art. Screws 180 adjust the balance of beam 172 to a horizontal position when inclinometer 170 is level. Beam 172 has a relatively large horizontal length 184 to vertical height 186 ratio (greater than 3:1) which makes it surprisingly insensitive to vibration and brief erratic movements of tractor 20. In one embodiment of the invention, the action of inclinometer 170 is further dampened by a liquid 182.

Figure 17:
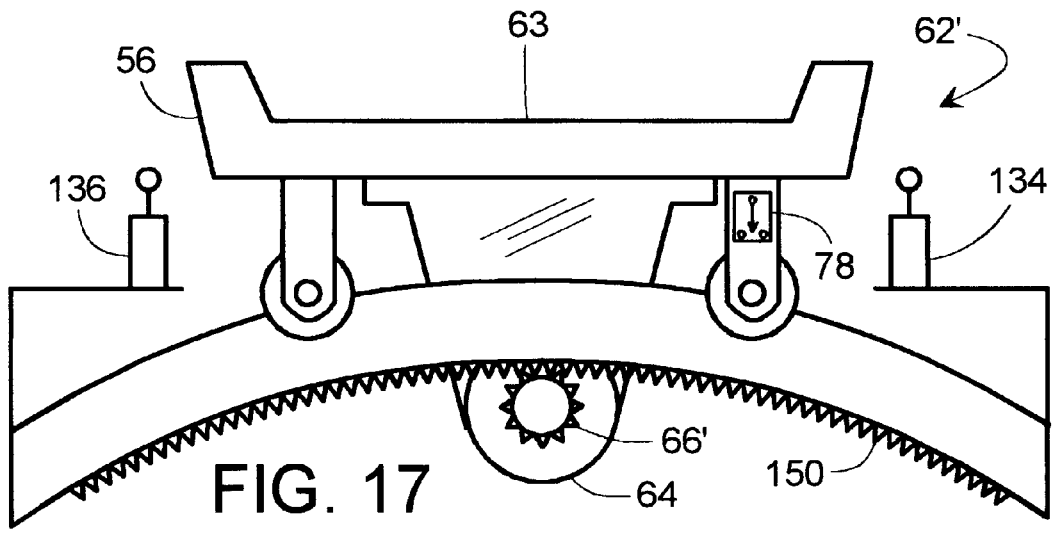
FIG. 17 is similar to that of FIG. 3 but showing a rack and pinion design.
Figure 18:
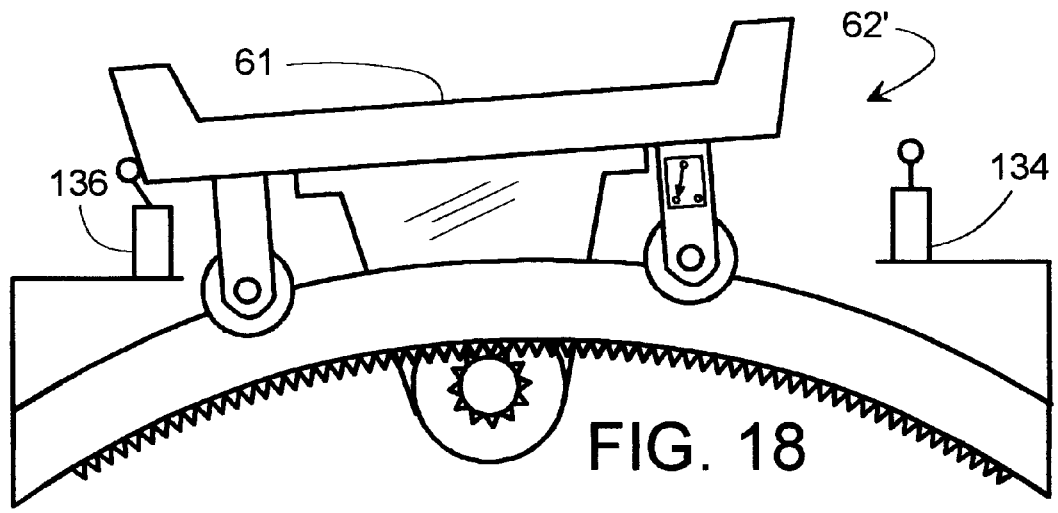
FIG. 18 is similar to that of FIG. 4 but showing a rack and pinion design.
Figure 19:
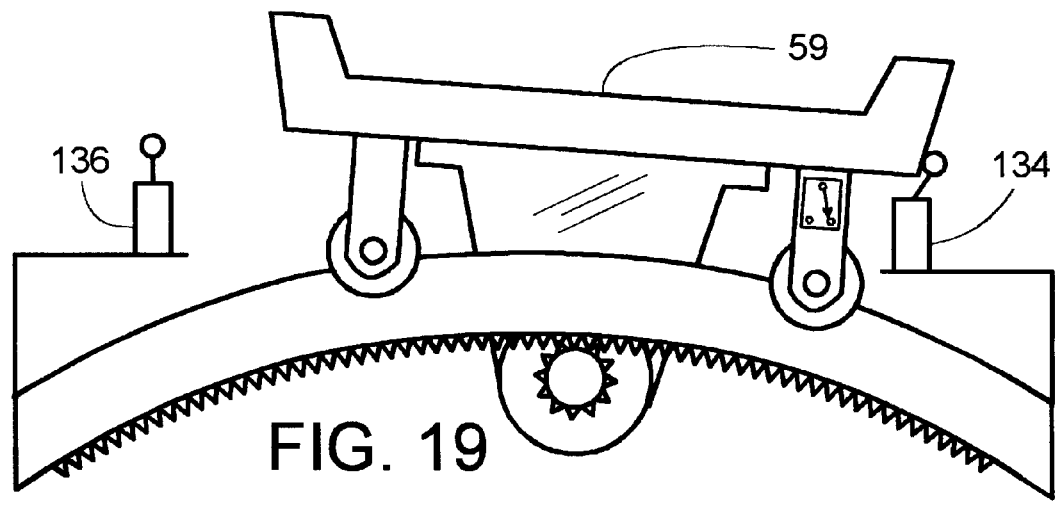
FIG. 19 is similar to that of FIG. 5 but showing a rack and pinion design.

In FIGS. 17–19, seat drive 62' is of a rack and pinion design (i.e., rack 150 and pinion 66'). Seat drive 62' has been specifically illustrated schematically so as to represent the countless variety of ways of driving a tractor seat relative to a tractor frame. For the design of FIGS. 17–19, the rack is generally stationary relative to the tractor frame, and the motor moves. Similar results can be achieved by fixing the motor relative to the tractor frame and having the rack move with the seat. For a rack and pinion design having a curved rack, the rack can be a roller chain (e.g., bicycle chain) rigidly attached to a curved support and the pinion can be a sprocket. Seat drive 62' can employ a lead screw and nut design, and hydraulic or pneumatic actuation is also well within the scope of the invention.

Other items worth noting is that motor 64 incorporates a gear box to provide high torque and low rpm. Normally closed, limit switches 134 and 136 (FIGS. 3–5, and 8) add over-travel limits.

In addition to varying inclination of terrain, the term "angular inclination" effects used herein and in the claims further encompasses equivalent effects brought on by centrifugal force created by tractor 20 turning varying directions along a level path.

In reference to the claims, the phrase "holding said seat frame substantially fixed relative to said tractor frame" obviously means that some relative movement may exist due to fit-up clearance between mating parts, part strain, suspension systems (e.g., cushions, springs, and shock absorbers for operator comfort), etcetera.

Although the invention is described with respect to a preferred embodiment, modifications thereto will be apparent to those skilled in the art. Therefore, the scope of the invention is to be determined by reference to the claims which follow:

We claim:

1. A self-leveling support for a seat for a vehicle adapted to carry an operator along a path having a varying direction and across a terrain having a varying incline, said self-leveling support comprising:

a base frame;

a seat frame movably coupled to said base frame and adapted to support said operator, said seat frame being repositionable relative to said base frame to a right position, a left position, and a central position, said seat frame having a bottom point defined as a lowest point of said seat frame when said seat frame is at said central position;

an inclinometer providing a reaction to an angular inclination of said inclinometer, wherein said angular inclination is affected by said tractor being subjected to said varying direction of said path and said varying incline; and a seat drive coupled to said base frame and said seat frame, said seat drive, in response to said reaction, driving said seat frame relative to said base frame to said right position upon said angular inclination shifting beyond a first predetermined limit, and driving said seat frame relative to said base frame to said left position upon said angular inclination shifting beyond a second predetermined limit, said seat frame at said right position and said left position defining a virtual rotational point about which said seat frame effectively rotates, said virtual rotational point being located below said bottom point of said seat frame.

2. Self-leveling support of claim 1 wherein said inclinometer is coupled to said seat frame.

3. Self-leveling support of claim 1 wherein said inclinometer includes a deadband existing between said first predetermined limit and said second predetermined limit between which said seat drive hold said seat frame substantially fixed relative to said base frame.

4. The self-leveling support of claim 3, further comprising a right wheel rotatably mounted relative to said base frame about a right rotational point; a left wheel rotatably mounted relative to said base frame about a left rotational point; and an axle centerline defined by said right rotational point and said left rotational point; wherein said inclinometer includes a plumb element whose position shifts toward said right wheel and toward said left wheel in response to changes in said angular inclination to create said reaction of said inclinometer, said inclinometer providing a centering force urging said plumb element to a neutral position, wherein said plumb element remains substantially at said neutral position until said angular inclination exceeds at least one of said first predetermined limit and said second predetermined limit, thereby creating said deadband.

5. Self-leveling support of claim 4 wherein said centering force is magnetic.

6. Self-leveling support of claim 1 wherein said seat frame is movably coupled to said base frame by way of an arcuate track having a center of curvature at said virtual rotational point.

7. The self-leveling support of claim 1 further comprising a right wheel rotatably mounted relative to said base frame about a right rotational point; a left wheel rotatably mounted relative to said base frame about a left rotational point; and an axle centerline defined by said right rotational point and said left rotational point; wherein said vehicle includes a center of gravity, and said virtual rotational point is below at least one of said center of gravity and said axle centerline.

8. Self-leveling support of claim 7 wherein said virtual rotational point is below both said center of gravity and said axle centerline.

9. Self-leveling support of claim 8 wherein said right wheel contacts said terrain at a right contact point and said left wheel contacts said terrain at a left contact point, said right contact point and said left contact point defining a contact line said contact line being at least as high as said virtual rotational point.

10. Self-leveling support of claim 1, wherein said inclinometer includes a balance beam having a horizontal length and a vertical height, said horizontal length being greater than said vertical height.

11. Self-leveling support of claim 1, wherein said balance beam is surrounded by a liquid to dampen movement of said balance beam.

12. A tractor having a center of gravity, said tractor being adapted to carry an operator along a path having a varying direction and across a terrain having a varying incline, said tractor comprising:

a tractor frame;

a right wheel rotatably mounted to said tractor frame about a right rotational point;

a left wheel rotatably mounted to said tractor frame about a left rotational point;

an axle centerline defined by said right rotational point and said left rotational point;

a seat frame movably coupled to said tractor frame and adapted to support said operator, said seat frame being repositionable relative to said tractor frame to a right position, a left position, and a central position;

an inclinometer providing a reaction to an angular inclination of said inclinometer, wherein said angular inclination is affected by said tractor being subjected to said varying direction of said path and said varying incline between said right wheel and said left wheel, said inclinometer being coupled to said seat frame;

a deadband existing between a first predetermined limit and a second predetermined limit of said angular inclination; and a seat drive coupled to said tractor frame and said seat frame, said seat drive, in response to said reaction, driving said seat frame to said tractor frame to said right position upon said angular inclination shifting beyond said first predetermined limit toward said left wheel, driving said seat frame to said left position upon said angular inclination shifting beyond said second predetermined limit toward said right wheel, and holding said seat frame substantially fixed relative to said tractor frame when said angular inclination is within said deadband wherein said angular inclination of said inclinometer is substantially level, said seat frame at said right position and said left position defining a virtual rotational point about which said seat frame effectively rotates, said virtual rotational point being located below said center of gravity.

13. The tractor of claim 12 wherein said inclinometer includes a plumb element whose position shifts toward said right wheel and toward said left wheel in response to changes in said angular inclination to create said reaction of said inclinometer, said inclinometer providing a centering force urging said plumb element to a neutral position, wherein said plumb element remains substantially at said neutral position until said angular inclination exceeds at least one of said first predetermined limit and said second predetermined limit, thereby creating said deadband.

14. The tractor of claim 13 wherein said centering force is magnetic.

15. The tractor of claim 12 wherein said seat frame is movably coupled to said tractor frame by way of an arcuate track having a center of curvature at said virtual rotational point.

16. The tractor of claim 12 wherein said tractor includes a center of gravity, and said virtual rotational point is below at least one of said center of gravity and said axle.

17. The tractor of claim 16 wherein said virtual rotational point is below both said center of gravity and said axle centerline.

18. The tractor of claim 17 wherein said right wheel contacts said terrain at a right contact point and said left wheel contacts said terrain at a left contact point, said right contact point and said left contact point defining a contact line, said contact line being at least as high as said virtual rotational point.

19. A tractor having a center of gravity, said tractor being adapted to carry an operator along a path having a varying direction and across a terrain having a varying incline, said tractor comprising:

a tractor frame;

a right wheel rotatably mounted to said tractor frame about a right rotational point, said right wheel contacting said terrain at a right contact point;

a left wheel rotatably mounted to said tractor frame about a left rotational point, said left wheel contacting said terrain at a left contact point;

a contact line defined by said right contact point and said left contact point;

an axle centerline defined by said right rotational point and said left rotational point;

an arcuate track attached to said frame and having a center of curvature below said center of gravity;

a seat frame adapted to support said operator and movably coupled to said tractor frame by way of said arcuate track along which said seat frame travels about said center of curvature, said seat frame being repositionable relative to said tractor frame to a right position, a left position and a central position, said seat frame having a bottom point defined as a lowest point of said seat frame when said seat frame is at said central position and said contact line is horizontal;

an inclinometer coupled to said seat frame, said inclinometer providing a reaction to an angular inclination of said inclinometer, wherein said angular inclination is affected by said tractor being subjected to said varying direction of said path and said varying incline between said right wheel and said left wheel;

a plumb element associated with said inclinometer, said plumb element having a position that shifts toward said right wheel and toward said left wheel in response to changes in said angular inclination to create said reaction of said inclinometer;

a magnetic centering force urging said plumb element to a neutral position, wherein said plumb element remains substantially at said neutral position until said angular inclination exceeds at least one of said first predetermined limit and said second predetermined limit, thereby creating a deadband therebetween; and a seat drive coupled to said tractor frame and said seat frame, said seat drive, in response to said reaction, driving said seat frame relative to said tractor frame to said right position upon said angular inclination shifting beyond said first predetermined limit toward said left wheel, driving said seat frame relative to said tractor frame to said left position upon said angular inclination shifting beyond said second predetermined limit toward said right wheel, and holding said seat frame substantially fixed relative to said tractor frame when said angular inclination is substantially within said deadband within which said angular inclination is substantially level.

20. The tractor of claim 19 wherein said contact line is at least as high as said center of curvature.

* * * * *